United States Patent Office 3,045,453
Patented July 24, 1962

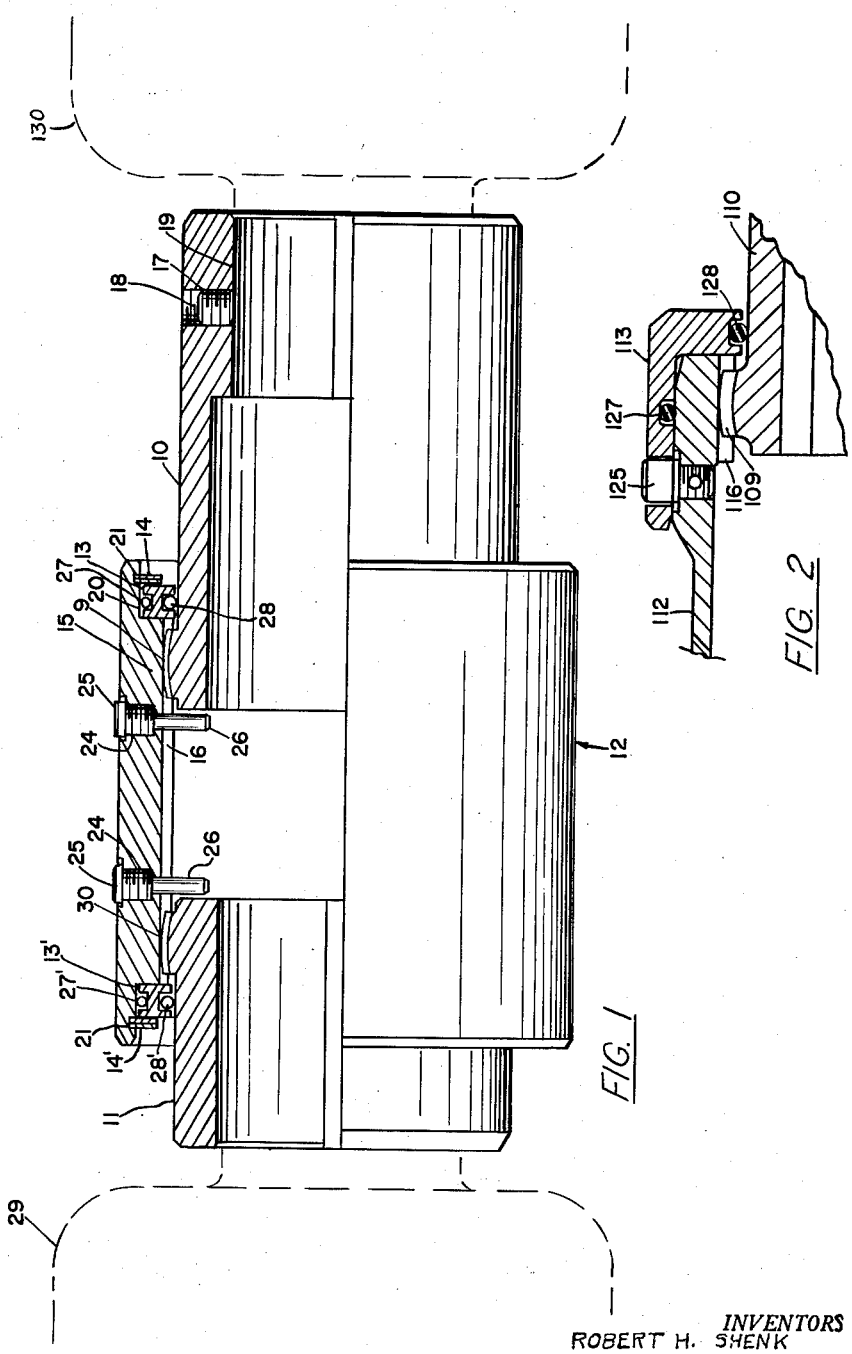

3,045,453
GEAR COUPLING WITH COMBINATION LUBRI-
CANT PLUG AND STOPS FOR LIMITING END
MOVEMENT OF HUBS
Robert H. Shenk and Lee E. Shaw, Erie, Pa., assignors to
Zurn Industries, Inc., Erie, Pa., a corporation of Pennsylvania
Filed May 2, 1960, Ser. No. 26,246
3 Claims. (Cl. 64—9)

This invention relates to flexible shaft couplings and, more particularly, to gear type couplings.

Various methods have been suggested and used for holding the hub of a gear coupling in position and limiting the travel thereof. Many of these structures have been complicated, expensive, and otherwise unsatisfactory.

It is, accordingly, an object of the present invention to provide such a coupling of high quality which is economical to manufacture and of such improved construction as to facilitate in the control of actual float of the coupling.

Another object of the invention is to provide a gear type self-aligning coupling with a single piece sleeve element having retainer pins therein which will limit end float of the coupling sleeve and act as a safety device against damage should either hub work off of its shaft.

Still another object of the invention is to provide an improved means for balancing a coupling.

A further object of the invention is to provide a coupling wherein standard parts can be used as opposed to special parts of a coupling which would be required in the usual application.

A still further object of the invention is to provide a coupling which is simple in construction and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing:

FIG. 1 is a side view of a coupling partly in longitudinal cross section showing a drive member and a driven member connected by the coupling; and FIG. 2 shows another embodiment of the invention.

Referring now more specifically to the drawing, in general, the flexible shaft coupling is shown having three main elements; that is, two similar complementary shaft hub members 10 and 11 connected by a unitary sleeve member 12 with cooperating sealing rings 13 and 14 in the ends of the sleeve member 12 cooperating with the shaft hub members 10 and 11 to maintain the coupling elements assembled and to provide a lubricant tight casing.

The shaft hub members 10 and 11 each comprise a cylindrical collar formed with an inner flange 15 having peripheral gear teeth 16. A threaded bore 17 formed radially in the walls of the hub receives set screws 18 to project therethrough into the inner shaft engaging a cylindrical bore 19 of the hub. The bore 19 will be of a size suitable to receive the drive shaft of a driving machine 130.

A particular feature of the invention resides in the cooperating sleeve member 12 and combination lubrication and stop plugs and the simplicity of construction rendering the coupling less expensive to manufacture and more efficient to use. Since the drive and driven members are fixed, the stop plugs will prevent the hubs 10 and 11 from working off of the shafts if they should become loose.

The teeth mate with spherical shaped gear teeth 9 on the drive hub 10 and spherical gear teeth 30 on the driven hub 11. These spherical gear teeth 9 and 30 permit the hubs 10 and 11 to operate in misaligned condition relative to each other.

The sleeve 12 is provided with sealing packing ring channels 20 of greater diameter than the gear teeth 9 and 30 for reception of the packing rings 13 and 13'. Grooves 21 are formed within the channels 20 for retaining the ring 14 in place. With this construction between the packing ring in the channel 20, the sleeve teeth may be easily formed by broaching operations cutting the teeth therethrough the entire length for both the hub members 10 and 11.

If the sleeve 12 were made of two parts, it would require a more complicated operation with gear cutting machinery or double operations in the usual procedure where the sleeve is formed in two parts, one for each hub. Both parts would have to be provided with flanges which are secured together with a reaming and counterboring of the bolt holes and flanges, all of which are eliminated by the improved coupling disclosed herein.

The sleeve 12 is provided with spaced threaded openings 24 spaced from each other and inwardly from the ends thereof a substantial distance and also spaced from the center of the hub. These openings 24 receive combination lubricant plugs and stop pins 25 which are threaded on their major sides and lockingly engage the bottom shoulders of the holes. The pins 25 have elongated cylindrical portions integral therewith which extend into the interior of the coupling at 26. These elongated cylindrical portions are spaced from the sealing members 14 and limit the amount of travel of the hubs 10 and 11 between the confines of the sealing rings and the stop pins 25. It will be readily seen that the elongated portions 26 of the stop pins extend far beyond the inner roots of the teeth, thereby providing considerable lengths which can be shortened and adjusted to reduce the weight of the stop pins and thereby to balance the coupling.

The plugs 25 can be removed in order to insert oil or other lubricant into the coupling.

The packing rings 13 are H-shaped in cross section and have a sealing ring 27 in the outer groove and another sealing ring 28 in the inner groove. The outer sealing ring 27 forms sealing engagement with the inner periphery of the ring channel 20 in the sleeve 12 and the inner sealing ring 28 forms sealing engagement with the cylindrical peripheries of the hubs outboard of the teeth.

To disassemble the coupling, it is merely necessary to remove the stop pins 25, loosen the set screws 18, and slide the hub 10 off of the motor shaft. The hub 10 will then be telescoped inside the sleeve 12. Then snap rings 14' and the sealing ring 13' can be removed from the driven end of the sleeve 12. The sleeve 12 may then be shifted toward the driving end until the sleeve 12 with the driving end and the hub 10 inside can be lifted or lowered through the spacing between the shafts. The final step in disassembling is to remove the press fitted driven end hub 11 from the driven equipment shaft end 29.

In the embodiment of the invention shown in FIG. 2, a sleeve 112 has a sealing member 113 supported thereon. The sleeve 112 has an inwardly directed flange with an inner peripheral groove receiving an O-ring 128. The O-ring 128 rests on an outer peripheral surface 110 of the hub.

The hub has external teeth 109 which engage internal splined teeth 130 on the sleeve 112. The sealing member 113 is held on the ends of the sleeve 112 by means of combination lubricant plugs and stop pins 125. The plugs or pins 125 are received in spaced holes in the sealing member 113 and they threadably engage the sleeve 112.

When it is desired to remove the sealing member 113, the plugs 125 can be removed. Thus, the sealing member 113 can be slid off the end of the sleeve 112. When it is desired to lubricate the sleeve, it is merely necessary to remove and insert the lubricant through the threaded holes which receive the plugs 125.

From the foregoing, the compactness of the coupling and its simplicity of the combination of the plugs therewith are readily apparent as well as the labor saving construction thereof, the ease of assembly and disassembly, and the simplicity in the end play and end floating of the hubs relative to the sleeve and, further, the facility of balancing the coupling by changing the size and weight of the stop pins.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A flexible shaft coupling of the self-aligning gear type comprising a pair of complementary shaft end hubs each having a collar with gear teeth on the adjacent ends of said hubs, a one piece cylindrical sleeve having internal gear teeth extending lengthwise over and in engagement with the gear teeth on both said hubs, said sleeve having sealing ring annular channels in the ends thereof of a greater diameter than the internal gear teeth therein and extending outwardly to the ends of said sleeve, permitting said sleeve to slide longitudinally onto or from the gear teeth on said hubs in either direction, a sealing packing ring in each of said sleeve channels, each said sealing packing ring comprising a rigid ring H-shaped in cross section engaging the corresponding hub adjacent to the gear teeth on the hub, said H-shaped rings defining an inner and an outer groove, said inner and said outer grooves each having an O-shaped washer therein, said rings providing a fluid seal for the members of said coupling for maintaining a lubricant in said sleeve, said sleeve having a sealing ring groove in each of said channels beyond said packing rings, a spring retaining ring in each of said grooves engaging each said H-shaped ring for holding said packing rings in place and maintaining said coupling assembled, and stop means on said sleeve between said hubs limiting the movement of said hubs toward each other.

2. The coupling recited in claim 1 wherein said stop means comprises threaded plugs engaging threaded holes in said sleeve and extending inwardly thereof beyond the innermost position of the roots of said hub teeth.

3. The coupling recited in claim 2 wherein said holes are counterbored and the threaded part thereof is in said counterbore and reduced size unthreaded parts of said plugs extend through the bores of said holes, said reduced size unthreaded parts of said plugs extending into said hubs a substantial distance and said plugs being adapted to be shortened to control the weight thereof to correct unbalance of said coupling.

References Cited in the file of this patent

UNITED STATES PATENTS

| | | |
|---|---|---|
| 2,510,414 | Philbrick | June 6, 1950 |
| 2,681,552 | Olson | June 22, 1954 |
| 2,744,449 | Belden et al. | May 8, 1956 |
| 2,861,435 | Seanor | Nov. 25, 1958 |